Patented Dec. 19, 1950

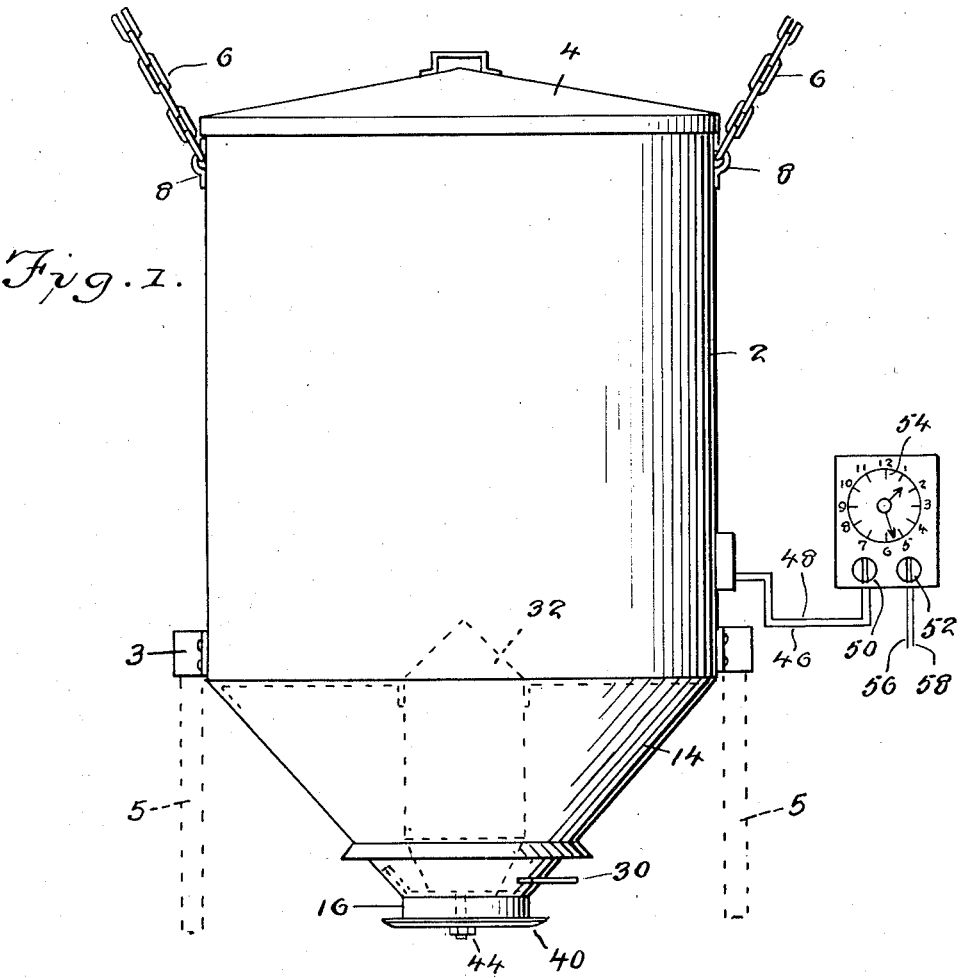

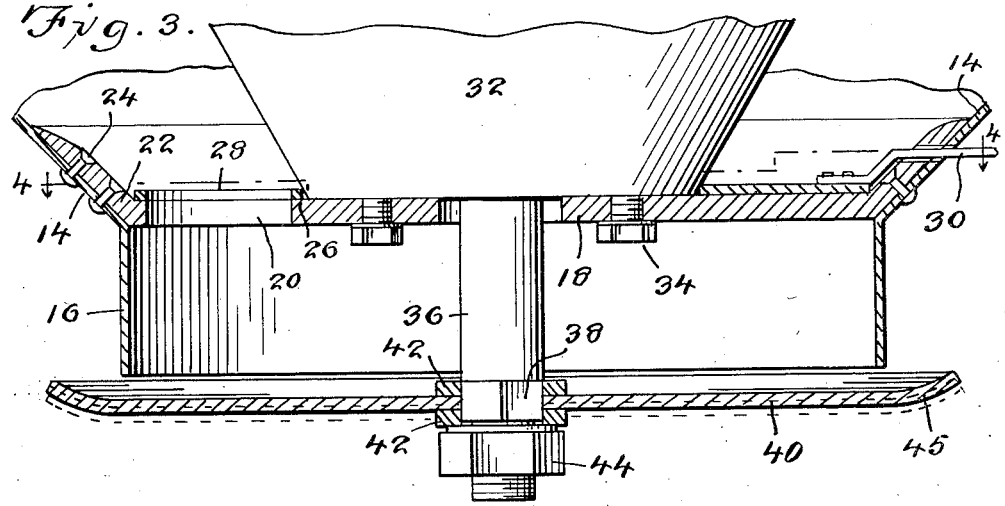
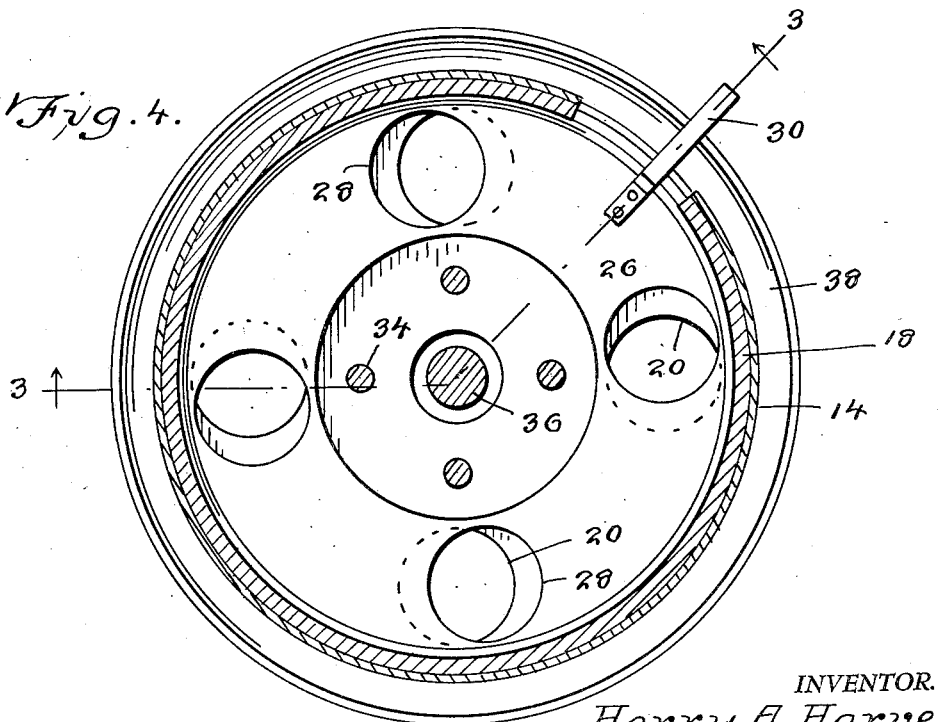

2,534,442

UNITED STATES PATENT OFFICE 2,534,442

GRAIN FEEDER FOR POULTRY

Harry A. Harvey, Niagara Falls, N. Y.

Application October 7, 1948, Serial No. 53,368

2 Claims. (Cl. 119—56)

My present invention relates to an improved grain feeder for poultry and especially to a feeder which will automatically at a predetermined time dispense a quantity of feed and scatter the feed over a relatively wide area.

Customarily poultry must be fed twice daily and the necessity for the personal attention of the poultryman is often inconvenient and troublesome and it is the purpose of my invention to provide apparatus for feeding poultry without the presence of the operator at feeding times.

In the accompanying drawings I have illustrated one complete example of the physical embodiment of my invention according to the best mode I have thus far devised, but it will be understood that various changes and alterations may be made in the exemplified structure within the scope of the appended claims.

In the drawings:

Fig. 1 is an elevational view of the feeder of my invention showing a conventional timing apparatus.

Fig. 2 is a partial elevational view showing a modified means for supporting the main housing.

Fig. 3 is a partial sectional view taken on the line 3—3 of Figure 4 and showing the dispensing mechanism.

Fig. 4 is a sectional view at line 4—4 of Fig. 3.

Referring now to the drawings I have illustrated the preferred embodiment of my invention as comprising a cylindrical container 2 having a removable lid 4 and supported by chains 6 by ears 8 from a ceiling or roof. In Figure 2, there is shown another means for supporting the container wherein the container may be supported by angle irons 10 on a shelf or table 12. Secured to the exterior of the container, adjacent the lower end thereof, is a plurality of sockets 3 which are adapted to receive therein legs 5 that may be used for supporting the container on a floor of a building.

A lower conical shroud 14 terminates in an annular collar 16 and above the collar I employ a plate 18 having openings 20 and secured by a flange ring 22 to the shroud by rivets 24.

A valve plate or disc 26 is rotatably positioned above the plate 18 and has openings 28 which may be aligned with the openings 20 to control the flow of grain therethrough. A handle 30 exterior of the housing permits the movement of the valve plate.

A motor 32 is secured by bolts 34 to the plate 18 and the shaft 36 on its squared end 38 carries a scattering plate or shelf 40 secured by washers 42 and nut 44 and this plate 40 is dished or inclined upwardly as at 45 and its spaced from the collar 16 a sufficient distance to allow the grain to be discharged only when the plate 40 rotates.

Electric wires 46 and 48 connect with controls 50 and 52 of clock 54 receiving current through wires 56 and 58 and this clock of conventional form permits the time and duration of the motor operation to be set at any predetermined hour.

Thus with the valve plate 26 set to control the quantity of feed passing to the scattering plate and the clock set, at a given time the motor will operate rotating the scattering plate and discharging the grain over the lip of the dished plate so that the poultry may be properly fed without the personal attention of the poultryman.

Having thus fully described my invention what I claim as new and desire to secure by Letters Patent is:

1. In a poultry feeder, a cylindrical container for holding poultry feed therein, a lid removably supported on said container, a shroud having a frusto-conical shape secured to the lower end of said container, said shroud terminating in a vertically disposed annular collar, a horizontally disposed plate extending across the bottom of said shroud and secured thereto, there being a plurality of openings in said plate, a disc rotatably supported above said plate and provided with openings adapted to be moved into and out of registry with the openings in said plate, a handle connected to said disc for rotating the latter, a motor supported by said plate and secured thereto, a vertically disposed shaft having its upper end connected to said motor, and a horizontally disposed shelf connected to the lower end of said shaft.

2. In a poultry feeder, a cylindrical container for holding poultry feed therein, a lid removably supported on said container, a shroud having a frusto-conical shape secured to the lower end of said container, said shroud terminating in a vertically disposed annular collar, a horizontally disposed plate extending across the bottom of said shroud and secured thereto, there being a plurality of openings in said plate, a disc rotatably supported above said plate and provided with openings adapted to be moved into and out of registry with the openings in said plate, a handle connected to said disc for rotating the latter, a motor supported by said plate and secured thereto, a vertically disposed shaft having its upper end connected to said motor, and a horizontally disposed shelf connected to the lower end of said shaft, said shelf being arranged in spaced relation below said collar, said shelf having its outer peripheral edges inclined upwardly.

HARRY A. HARVEY.

REFERENCES CITED

The following references are of record in the file of this patent:

UNITED STATES PATENTS

| Number | Name | Date |
| --- | --- | --- |
| 502,604 | Bollinger | Aug. 1, 1893 |
| 1,355,399 | Kelley | Oct. 12, 1920 |
| 1,359,691 | Genuit | Nov. 23, 1920 |
| 1,471,919 | Robinson | Oct. 23, 1923 |
| 1,574,398 | Kisner | Feb. 23, 1926 |
| 2,314,109 | Smith | Mar. 16, 1943 |